US007923157B2

(12) United States Patent
Kim et al.

(10) Patent No.: US 7,923,157 B2
(45) Date of Patent: Apr. 12, 2011

(54) LITHIUM SECONDARY BATTERY OF IMPROVED HIGH-TEMPERATURE CYCLE LIFE CHARACTERISTICS

(75) Inventors: Jonghwan Kim, Daejeon (KR); Jisang Yu, Daejeon (KR); Jeong-Ju Cho, Daejeon (KR); Hochun Lee, Daejeon (KR); Joomi Jeon, Chungcheongbuk-do (KR); Yongsu Choi, Chungcheongbuk-do (KR); Ra Young Hwang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 12/525,010

(22) PCT Filed: Dec. 27, 2007

(86) PCT No.: PCT/KR2007/006885
§ 371 (c)(1),
(2), (4) Date: Mar. 11, 2010

(87) PCT Pub. No.: WO2008/096961
PCT Pub. Date: Aug. 14, 2008

(65) Prior Publication Data
US 2010/0209781 A1   Aug. 19, 2010

(30) Foreign Application Priority Data
Feb. 8, 2007   (KR) .................. 10-2007-0012967

(51) Int. Cl.
*H01M 6/16*   (2006.01)
*H01M 10/26*   (2006.01)
*H01G 9/035*   (2006.01)
*H01G 9/00*   (2006.01)
*H01G 9/02*   (2006.01)

(52) U.S. Cl. ........ 429/332; 429/188; 429/207; 252/62.2
(58) Field of Classification Search ............. 429/188, 429/207, 332; 522/62.2
See application file for complete search history.

(56) References Cited

U.S. PATENT DOCUMENTS

| 4,535,389 A | 8/1985 | Buczkowski et al. |
| 6,043,975 A | 3/2000 | Kanbara et al. |
| 2006/0040173 A1* | 2/2006 | Shimamura et al. ......... 429/99 |
| 2007/0003824 A1* | 1/2007 | Jo et al. ..................... 429/66 |

FOREIGN PATENT DOCUMENTS

| JP | 2000-340232 A | | 12/2000 |
| JP | 2002-25605 A | | 1/2002 |
| JP | 2002-373833 | * | 12/2002 |
| KR | 10-2006-0092074 A | | 10/2006 |
| KR | 10-2007-0097864 A | | 10/2007 |
| WO | WO 02/061775 | * | 8/2002 |
| WO | WO-02/061775 A1 | | 8/2002 |

* cited by examiner

*Primary Examiner* — Ula C Ruddock
*Assistant Examiner* — Amanda Barrow
(74) *Attorney, Agent, or Firm* — Birch, Stewart, Kolasch & Birch, LLP

(57) ABSTRACT

Disclosed is a lithium secondary battery comprising a cathode including a lithium-containing transition metal oxide, an anode including a carbon-based material, and a non-aqueous electrolyte with addition of a compound of formula (1). Incorporation of the compound (1) into the electrolyte significantly improves the high-temperature performance and cycle life characteristics of the battery.

19 Claims, No Drawings

LITHIUM SECONDARY BATTERY OF IMPROVED HIGH-TEMPERATURE CYCLE LIFE CHARACTERISTICS

FIELD OF THE INVENTION

The present invention relates to a lithium secondary battery with improved high-temperature cycle life characteristics. More specifically, the present invention relates to a lithium secondary battery with significantly improved high-temperature performance and cycle life characteristics, comprising a cathode including a lithium-containing transition metal oxide, an anode including a carbon-based material, and a non-aqueous electrolyte with the incorporation of a certain compound which is capable of lowering a concentration of a hazardous material causing deterioration of the battery performance, through a chemical reaction of that compound with such an undesirable material. Incorporation of such a certain compound into the electrolyte significantly improves the high-temperature performance and cycle life characteristics of the battery.

BACKGROUND OF THE INVENTION

Technological development and increased demand for mobile equipment have led to a rapid increase in the demand for secondary batteries as an energy source. Among other things, a great deal of research and study has been focused on lithium secondary batteries having high energy density and voltage. These lithium secondary batteries are also commercially available and widely used.

In general, the lithium secondary battery is comprised of a cathode, an anode and a separator therebetween, with addition of an electrolyte. In this connection, the electrolyte is used in the form of a material which contains a suitable amount of a lithium salt dissolved in an organic solvent. Examples of the lithium salt added to the electrolyte may include conventionally used materials such as $LiPF_6$, $LiBF_4$, $LiClO_4$, $LiN(C_2F_5SO_3)_2$, and the like. These materials serve as a lithium ion source in the battery to enable the basic operation of the lithium battery.

Currently available electrolytes undergo various side reactions during charge/discharge processes, and the thus-produced by-products may be responsible for deterioration of the battery performance.

Particularly when a lithium salt $LiPF_6$ is incorporated into the electrolyte, $LiPF_6$ should be present in ionic forms of $Li^+$ and $PF_6^-$. Usually, contrary to intentions, side reactions take place with production of an unstable by-product $PF_5$, which subsequently reacts with $H_2O$ to result in formation of HF. HF causes destruction of the SEI layer and cathode dissolution, which becomes more severe at high temperatures.

Upon initial charge of the lithium secondary battery, lithium ions deintercalate from the cathode and intercalate between layers of the graphite electrode used as the anode. At this time, the lithium ions react with carbon atoms of the anode to form a passivation film, called Solid Electrolyte Interface (SEI), on the anode surface. Once the SEI layer is formed, the lithium ions do not undergo the side reaction with the graphite anode or other materials. Therefore, destruction of the SEI layer by HF resulting from the side reaction of $LiPF_6$ in the electrolyte may result in serious malfunction of the battery operation.

In order to prevent the problems as mentioned above, additives may be used in the electrolyte. A primary function of conventional electrolyte additives was to prevent formation of by-products occurring upon charge and discharge of the battery.

A conventional lithium secondary battery undergoes numerous side reactions as well as a favorable forward reaction for the lithium salt $LiPF_6$, so the operation efficiency of the battery is lowered. Major side reactions may include formation of LiF and $PF_5$ from decomposition of $LiPF_6$ (side reaction-1), formation of HF and $POF_3$ from reaction of $PF_5$ (from side reaction-1) with trace water in the electrolyte (side reaction-2), and HF-induced SEI destruction on the anode (side reaction-3).

Furthermore, additional materials other than HF may be produced such as HCl, HBr, and HI, depending upon kinds of lithium salts used as the electrolyte. These by-products may act as acid thereby exerting potentially deleterious functions as HF does.

In this connection, Korean Patent Application Publication No. 2006-92074 A1, assigned to the present applicant, proposes a technique of improving the high-temperature storage performance of a battery via addition of an ammonium compound to a non-aqueous electrolyte. The inventors of the present invention have made extensive investigations on such a subject to improve the high-temperature storage performance of the battery. As a result, they have found that when a certain compound of the present invention among these ammonium compounds is used in the fabrication of the battery, solubility of that compound in the electrolyte is significantly increased to thereby greatly improve the high-temperature storage performance to a degree that cannot be achieved by the above Korean Patent. This fact can be further confirmed in Examples and Comparative Examples which will be illustrated hereinafter. Meanwhile, even though it is unrelated to the present invention, U.S. Pat. No. 4,535,389 discloses a technique of improving high-temperature output characteristics via addition of ammonium benzoate to a capacitor electrolyte. However, the above prior art is a technique which applies to the capacitor. Further, ammonium benzoate, as described above, has low solubility in an electrolyte for the secondary battery, and as such it is impossible to improve the high-temperature storage performance to a desired degree.

Upon considering the fact that performance of a secondary battery at high temperatures becomes more important, there is an urgent need for development of a more effective additive.

SUMMARY OF THE INVENTION

Therefore, the present invention has been made to solve the above problems and other technical problems that have yet to be resolved.

As a result of a variety of extensive and intensive studies and experiments to solve the problems as described above, the inventors of the present invention, as will be described hereinafter, have discovered that, in a lithium secondary battery comprised of a cathode including a lithium-containing transition metal oxide, an anode including a carbon-based material, a porous separator and a lithium salt-containing electrolyte with addition of a certain compound which is capable of lowering a concentration of a hazardous material causing deterioration of the battery performance, through a chemical reaction of that compound with such an undesirable material, the incorporation of such a compound makes it possible to fabricate a lithium secondary battery having significantly improved high-temperature performance and cycle life characteristics. The present invention has been completed based on these findings.

DETAILED DESCRIPTION OF PREFERRED EMBODIMENTS

In accordance with an aspect of the present invention, the above and other objects can be accomplished by the provision of a lithium secondary battery comprising:

(a) a cathode active material including a lithium-containing transition metal oxide having reversible lithium intercalation/deintercalation capacity;

(b) an anode active material including graphitized carbon having reversible lithium intercalation/deintercalation capacity;

(c) a porous separator; and (d) a non-aqueous electrolyte containing (i) a lithium salt, (ii) an electrolyte compound, and (iii) a compound of formula (1);

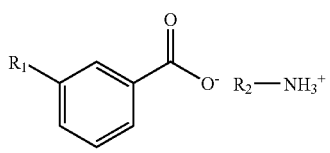

(1)

wherein $R_1$ is $C_1$-$C_5$ lower alkyl, and $R_2$ is hydrogen or $C_1$-$C_5$ lower alkyl.

The compound of formula (1) reacts with a material that contains acid ($H^+$) and then causes a side reaction in the electrolyte to thereby result in deterioration of the battery performance. This reaction of the compound (1) with such an undesirable material brings about conversion of the undesirable material into a non-reactive material, which consequently leads to formation of a stable surface coating on the anode to thereby inhibit precipitation of metal ions. Therefore, it is possible to suppress additional electrolyte decomposition resulting from precipitation of metal ions. In such a manner, addition of the compound (1) to the electrolyte can improve the high-temperature performance and cycle life characteristics of the battery, by reducing degradation of high-temperature cycle characteristics of the lithium secondary battery and deterioration of residual capacity and recovery capacity resulting from high-temperature storage of the battery.

Specifically in a secondary battery containing a lithium salt $LiPF_6$ as a cathode active material, there are various side reactions as well as a favorable forward reaction as shown in the following reactions below, so the operation efficiency of the battery is lowered. Occurrence of these side reactions is more pronounced at high temperatures.

$LiPF_6 \rightarrow Li^+ + PF_6^-$ (forward reaction)
$LiPF_6 \rightarrow LiF + PF_5$ (side reaction-1)
$PF_5 + H_2O \rightarrow 2HF + POF_3$ (side reaction-2)
$HF \rightarrow$ destruction of anode SEI layer (side reaction-3)

However, the present invention features the incorporation of the compound (1) into the electrolyte, and the added compound (1) reacts with HF produced from the side reaction-1 and side reaction-2, which brings about conversion of acid ($H^+$) having adverse effects on the battery performance into a non-reactive material to thereby inhibit occurrence of the side reactions.

When $R_1$ and $R_2$ in formula (1) are independently $C_1$-$C_5$ lower alkyl, the term "alkyl" refers to an aliphatic hydrocarbon group. An alkyl moiety may be a "saturated alkyl" group, thus representing that no alkene or alkyne portion is contained. Alternatively, the alkyl moiety may be an "unsaturated alkyl" group, thus being capable of containing at least one alkene or alkyne portion. The term "alkene" moiety refers to a group in which at least two carbon atoms form at least one carbon-carbon double bond. The term "alkyne" moiety refers to a group in which at least two carbon atoms form at least one carbon-carbon triple bond. The alkyl moiety, regardless of whether it is saturated or unsaturated, may be branched, linear or cyclic. Examples of the alkyl may include, but are not limited to, methyl, ethyl, propyl, iso-propyl, n-butyl, iso-butyl, t-butyl, pentyl, ethenyl, propenyl, butenyl, cyclopropyl, cyclobutyl, and cyclopentyl. Where appropriate, the alkyl group may also be optionally substituted by hydroxy, halogen, amine, or the like.

The compound of formula (1) in accordance with the present invention, as defined above, is characterized by substitution of $R_1$ at a meta position of a benzene ring.

In this connection, according to the experiments conducted by the present inventors, it was confirmed that the compound of formula (1) exhibits significantly higher solubility in the electrolyte, as compared to unsubstituted ammonium benzoate, or ortho- or para-substituted analogs. That is, when the ammonium compound with low solubility is used, a concentration of the added compound is variable, so it is difficult to control physical properties of a desired product due to variable and low effects on improvements of the high-temperature performance. Whereas, the meta-substituted ammonium compound as in the present invention has high solubility, and therefore exhibits excellent efficiency relative to an amount of the compound to be added, and uniformly improved high-temperature performance and cycle life.

Therefore, the compound of formula (1) has solubility of preferably at least 1% by weight, more preferably 10% by weight or higher in the electrolyte.

Further, it was confirmed that performance characteristics of the battery are very excellent when $R_1$ is methyl. Accordingly, particularly preferred is m-methylbenzoic acid methylammonium of formula (2) wherein $R_1$ and $R_2$ are independently methyl, or m-methylbenzoic acid ammonium of formula (3) wherein $R_1$ is methyl. The compound of formula (2) is more preferable with respect to additive effects of the compound.

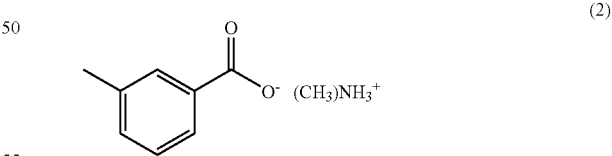

(2)

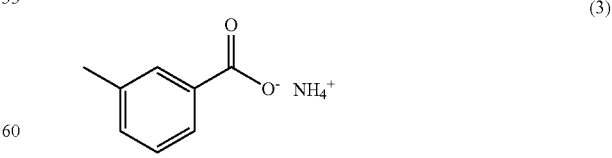

(3)

For example, the m-methylbenzoic acid methylammonium of formula (2) reacts with HF produced from side reactions in the electrolyte, thereby resulting in formation of m-methylbenzoic acid and methylammonium fluoride in the form of a non-reactive material. Therefore, it is possible to prevent deterioration of the battery performance and improve high-temperature cycle life characteristics of the battery.

The content of the compound (1) is preferably in a range of 0.01 to 10% by weight, based on the total weight of the electrolyte. When the content of the additive is too low, it is difficult to achieve desired additive effects. On the other hand, when the content of the additive is too high, this undesirably leads to increased viscosity of the electrolyte and increased resistance of the thus-fabricated battery, thereby deteriorating performance of the battery.

As discussed above, a lithium secondary battery in accordance with the present invention is comprised of a cathode active material including a lithium-containing transition metal oxide, an anode active material including a carbon-based material, a porous separator and a lithium salt, an electrolyte compound, and an electrolyte containing the above-mentioned compound.

Examples of the lithium-containing transition metal oxide that can be used in the cathode active material may include one or more metal oxides selected from the group consisting of compounds represented by formula (4):

$$LiCO_aMn_bNi_cM_dO_2 \qquad (4)$$

wherein
$0 \leq a \leq 1$;
$0 \leq b \leq 1$;
$0 \leq c \leq 1$;
$0 \leq d \leq 1$, with proviso that $a+b+c+d=1$; and
M is selected from the group consisting of Al, B, Ga, Mg, Si, Ca, Ti, Zn, Ge, Y, Zr, Sn, Sr, Ba and Nb; and
compounds represented by formula (5):

$$Li_xMn_{2-y}M'_yO_4 \qquad (5)$$

wherein
$0.9 \leq X \leq 2$;
$0 \leq Y \leq 0.5$; and
M' is selected from the group consisting of Fe, Co, Ni, Cu, Zn, Al, Sn, Cr, V, Ti, Mg, Ca, Sr, B, Ga, In, Si and Ge.

Preferred examples of the compounds of formulae (4) and (5) may include $LiCoO_2$, $LiNiO_2$, $LiMn_2O_4$, and $LiNi_{1-x}Co_xO_2$ (0<X<1).

The cathode is, for example, fabricated by applying a mixture of a cathode active material, a conductive material and a binder to a cathode current collector, followed by drying. If necessary, a filler may be further added to the above mixture.

The cathode current collector is generally fabricated to have a thickness of 3 to 500 μm. There is no particular limit to materials for the cathode current collector, so long as they have high conductivity without causing chemical changes in the fabricated battery. As examples of the materials for the cathode current collector, mention may be made of stainless steel, aluminum, nickel, titanium, sintered carbon, and aluminum or stainless steel which was surface-treated with carbon, nickel, titanium or silver. The current collector may be fabricated to have fine irregularities on the surface thereof so as to enhance adhesion to the cathode active material. In addition, the current collector may take various forms including films, sheets, foils, nets, porous structures, foams and non-woven fabrics.

The conductive material is typically added in an amount of 1 to 50% by weight, based on the total weight of the mixture including the cathode active material. There is no particular limit to the conductive material, so long as it has suitable conductivity without causing chemical changes in the fabricated battery. As examples of conductive materials, mention may be made of conductive materials, including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives.

The binder is a component assisting in binding of the electrode active material with the conductive material, and in binding of the electrode active material with the current collector. The binder is typically added in an amount of 1 to 50% by weight, based on the total weight of the mixture including the cathode active material. As examples of the binder, mention may be made of polyvinylidene fluoride, polyvinyl alcohols, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber and various copolymers.

The filler is an optional ingredient used to inhibit cathode expansion. There is no particular limit to the filler, so long as it does not cause chemical changes in the fabricated battery and is a fibrous material. As examples of the filler, there may be used olefin polymers such as polyethylene and polypropylene; and fibrous materials such as glass fiber and carbon fiber.

As the carbon-based material in the anode active material, it is preferred to use graphitized carbon in which a carbonaceous material used as the anode active material has the lattice spacing ($d_{002}$) of less than 0.338 nm, as measured by X-ray diffraction, and has a specific surface area of less than 10 m$^2$/g, as measured by a BET method.

The anode is fabricated by applying an anode material to an anode current collector, followed by drying. If necessary, other components as described above may be further included.

The anode current collector is generally fabricated to have a thickness of 3 to 500 μm. There is no particular limit to materials for the anode current collector, so long as they have suitable conductivity without causing chemical changes in the fabricated battery. As examples of materials for the anode current collector, mention may be made of copper, stainless steel, aluminum, nickel, titanium, sintered carbon, copper or stainless steel having a surface treated with carbon, nickel, titanium or silver, and aluminum-cadmium alloys. Similar to the cathode current collector, the anode current collector may also be processed to form fine irregularities on the surfaces thereof so as to enhance adhesion to the anode active material. In addition, the anode current collector may be used in various forms including films, sheets, foils, nets, porous structures, foams and non-woven fabrics.

The separator is interposed between the cathode and anode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene and/or a glass fiber or polyethylene, which have chemical resistance and hydrophobicity, are used. When a solid electrolyte such as a polymer is employed as the electrolyte, the solid electrolyte may also serve as both the separator and electrolyte.

The non-aqueous electrolyte for a lithium secondary battery is composed of a non-aqueous electrolyte and a lithium salt. As the non-aqueous electrolyte, a non-aqueous electrolytic solution, an organic solid electrolyte or an inorganic solid electrolyte may be utilized.

As examples of the non-aqueous electrolytic solution that can be used in the present invention, mention may be made of aprotic organic solvents such as N-methyl-2-pyrollidinone (NMP), propylene carbonate (PC), ethylene carbonate (EC), butylene carbonate (BC), dimethyl carbonate (DMC), diethyl carbonate (DEC), ethylmethyl carbonate (EMC), gamma-butyro lactone (GBL), 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate. Among these solvent compounds, particularly preferred are ethylene carbonate (EC), propylene carbonate (PC), butylene carbonate (BC), vinylene carbonate (VC), diethyl carbonate (DEC), dimethyl carbonate (DMC), ethylmethyl carbonate (EMC), gamma-butyro lactone (GBL), sulfolane, methyl acetate (MA), ethyl acetate (EA), methyl propionate (MP) and ethyl propionate (EP).

In one preferred embodiment of the present invention, the non-aqueous electrolytic solution may be a mixture of at least one linear carbonate compound and at least one cyclic carbonate compound. Representative examples of the linear carbonate may include dimethyl carbonate (DMC), diethyl carbonate (DEC) and ethylmethyl carbonate (EMC). As examples of the cyclic carbonate, mention may be made of ethylene carbonate (EC), propylene carbonate (PC) and butylene carbonate (BC). Particularly preferred is a mixed non-aqueous electrolytic solution of EC/EMC.

As examples of the organic solid electrolyte utilized in the present invention, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte utilized in the present invention, mention may be made of nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas.

The secondary battery in accordance with the present invention may be preferably used for a high-power, large-capacity, medium/large battery module, via a combination of multiple batteries as a unit battery. This is because the high-temperature cycle life may be an important factor which is necessary to exert desired operation characteristics, as the high-power, large-capacity, medium/large battery module is frequently susceptible to external forces such as vibration, external impact, etc. and therefore requires excellent mechanical strength against external forces, and a loading amount of an electrode active material relative to a current collector is high in the structure of a battery cell constituting a battery pack.

EXAMPLES

Now, the present invention will be described in more detail with reference to the following Examples. These examples are provided only for illustrating the present invention and should not be construed as limiting the scope and spirit of the present invention.

Example 1

0.1% by weight of m-methylbenzoic acid methylammonium was added to a solution of 1M $LiPF_6$ in ethylene carbonate/ethyl methyl carbonate (hereinafter, referred to as a 1M $LiPF_6$ EC/EMC solution) and the mixture was then stirred to prepare an electrolyte.

Example 2

0.2% by weight of m-methylbenzoic acid methylammonium was added to a 1M $LiPF_6$ EC/EMC solution and the mixture was then stirred to prepare an electrolyte.

Example 3

0.5% by weight of m-methylbenzoic acid methylammonium was added to a 1M $LiPF_6$ EC/EMC solution and the mixture was then stirred to prepare an electrolyte.

Example 4

0.1% by weight of m-methylbenzoic acid ammonium was added to a 1M $LiPF_6$ EC/EMC solution and the mixture was then stirred to prepare an electrolyte.

Comparative Example 1

A 1M $LiPF_6$ EC/EMC solution without addition of m-methylbenzoic acid methylammonium was used as an electrolyte.

Comparative Example 2

0.1% by weight of ammonium benzoate was added to a 1M $LiPF_6$ EC/EMC solution and the mixture was then stirred to prepare an electrolyte.

Comparative Example 3

0.1% by weight of o-methylbenzoic acid methylammonium was added to a 1M $LiPF_6$ EC/EMC solution and the mixture was then stirred to prepare an electrolyte.

Comparative Example 4

0.1% by weight of o-methylbenzoic acid ammonium was added to a 1M LiPF$_6$ EC/EMC solution and the mixture was then stirred to prepare an electrolyte.

Comparative Example 5

0.1% by weight of p-methylbenzoic acid methylammonium was added to a 1M LiPF$_6$ EC/EMC solution and the mixture was then stirred to prepare an electrolyte.

Comparative Example 6

0.1% by weight of p-methylbenzoic acid ammonium was added to a 1M LiPF$_6$ EC/EMC solution and the mixture was then stirred to prepare an electrolyte.

Experimental Example 1

The solubility of additives in an electrolyte was measured for Examples 1 and 4, and Comparative Examples 2 to 6. The results obtained are given in Table 1 below.

TABLE 1

| | Additives | Chemical structure | Solubility |
|---|---|---|---|
| Ex. 1 | m-methylbenzoic acid methylammonium | 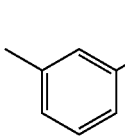 | 10 wt % or higher |
| Ex. 4 | m-methylbenzoic acid ammonium | 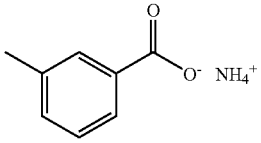 | 10 wt % or higher |
| Comp. Ex. 2 | Ammonium benzoate | 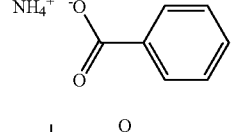 | 0.03 wt % or less |
| Comp. Ex. 3 | o-methylbenzoic acid methylammonium | 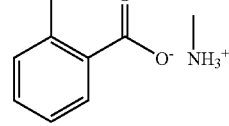 | 0.75 wt % or less |
| Comp. Ex. 4 | o-methylbenzoic acid ammonium | 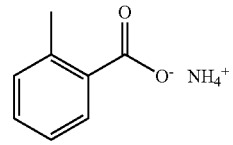 | 0.75 wt % or less |
| Comp. Ex. 5 | p-methylbenzoic acid methylammonium | 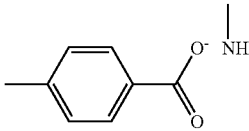 | 0.03 wt % or less |
| Comp. Ex. 6 | p-methylbenzoic acid ammonium | 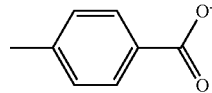 | 0.03 wt % or less |

As shown in Table 1, m-methylbenzoic acid methylammonium and m-methylbenzoic acid ammonium according to Examples 1 and 4 of the present invention exhibited high solubility of more than 10% by weight, whereas ammonium benzoate and para-methyl-substituted analogs exhibited extremely low solubility of less than 0.03% by weight, thus representing that they are substantially insoluble. Further, it can be seen that ortho-methyl-substituted analogs exhibit low solubility of less than approximately 0.75% by weight, ranging from 0.5 to 1.0% by weight. Therefore, when the additive compound has low solubility, a concentration of the added compound is variable, so there is difficulty with control of physical properties and desired improvement of the high-temperature performance.

Experimental Example 2

Using spinel manganese as a cathode, a carbon electrode as an anode, and electrolytes prepared in Examples 1 through 3 and Comparative Examples 1 and 2, the corresponding pouch-type full cells were fabricated. The thus fabricated cells were stored at a temperature of 60° C. for 8 weeks and were measured for the output (in terms of a ratio relative to initial output) after 4 and 8 weeks, respectively. The results obtained are given in Table 2 below.

TABLE 2

| | Output (%) after high-temperature storage | |
|---|---|---|
| | After 4 weeks | After 8 weeks |
| Ex. 1 | 94.4 | 90.2 |
| Ex. 2 | 95.0 | 92.5 |
| Ex. 3 | 95.3 | 93.6 |
| Comp. Ex. 1 | 91.7 | 82.2 |
| Comp. Ex. 2 | 93.6 | 88.4 |

As can be seen from Table 2, the lithium secondary batteries with addition of a certain compound (m-methylbenzoic acid methylammonium) capable of lowering a concentration of a material causing deterioration of the battery performance through the chemical reaction of that compound with such an undesirable material to the electrolyte of the present invention (Examples 1 to 3) exhibited a significantly excellent output ratio relative to the initial output after high-temperature storage, as compared to the lithium secondary battery to which no additive was added (Comparative Example 1). That is, it was confirmed that incorporation of the m-methylbenzoic acid methylammonium leads to inhibition of side reactions within the battery during high temperature storage, thereby significantly improving capacity characteristics of the battery. Further, high-temperature storage characteristics are improved with increasing contents of m-methylbenzoic acid methylammonium and a longer period of high-temperature storage time.

The lithium secondary battery (Comparative Example 2) with addition of ammonium benzoate, as shown in Table 2, exhibited high-temperature storage characteristics to some extent, even though it is inferior to the secondary batteries of Examples 1 to 3 in accordance with the present invention. Therefore, in order to confirm the application reliability upon practical fabrication of the battery, 30 secondary batteries of Example 1 and 30 secondary batteries of Comparative Example 2 were fabricated and measured for high-temperature storage characteristics under the same conditions as described above.

As a result, the secondary batteries of Example 1 exhibited an output deviation of less than 1.5% based on the mean value, after high-temperature storage for 8 weeks, whereas the secondary batteries of Comparative Example 2 exhibited an output deviation of about 5% under the same conditions. The reason why the secondary batteries of Comparative Example 2 exhibited a relatively high output deviation is believed to be probably due to the practical concentration of the additive in the electrolyte not being maintained at a constant level, due to poor solubility of the additive in the electrolyte. Accordingly, it can be seen that the secondary battery of the present invention is significantly superior in terms of the application reliability upon practical fabrication of a secondary battery.

INDUSTRIAL APPLICABILITY

As apparent from the above description, a lithium secondary battery in accordance with the present invention can realize improved high-temperature performance and cycle life characteristics, via the incorporation of a certain compound which chemically reacts with a material causing deterioration of the battery performance to thereby lower a concentration of such an undesirable material.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A lithium secondary battery comprising:
   (a) a cathode active material including a lithium-containing transition metal oxide having reversible lithium intercalation/deintercalation capacity, the lithium-containing transition metal oxide being at least one selected from the group consisting of $LiCO_aMn_bNi_cM_dO_2$ and $Li_xMn_{2-y}M'_yO_4$,
   wherein $0 \leq a \leq 1$; $0 \leq b \leq 1$; $0 \leq d \leq 1$, with the proviso that $a+b+c+d=1$; $0.9 \leq X \leq 2$; $0 \leq Y \leq 0.5$; M' is selected from the group consisting of Al, B, Ga, Mg, Si, Ca, Ti, Zn, Ge, Y, Zr, Sn, Sr, Ba and Nb; and M' is selected from the group consisting of Fe, Co, Ni, Cu, Zn, Al, Sn, Cr, V, Ti, Mg, Ca, Sr, B, Ga, In, Si and Ge;
   (b) an anode active material including carbon-based material having reversible lithium intercalation/deintercalation capacity, the carbon-based material being graphitized carbon having a lattice spacing (d002) of less than 0.338 nm, as measured by X-ray diffraction, and a specific surface area of less than 10 m²/g, as measured by a BET method;
   (c) a porous separator; and
   (d) a non-aqueous electrolyte containing (i) a lithium salt, (ii) an electrolyte compound, and (iii) a compound of formula (I):

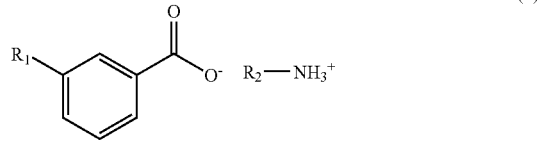

wherein $R_1$ is $C_1$-$C_5$ lower alkyl, and $R_2$ is hydrogen or $C_1$-$C_5$ lower alkyl.

2. The lithium secondary battery according to claim 1, wherein $R_1$ is methyl.

3. The lithium secondary battery according to claim 1, wherein $R_2$ is methyl.

4. The lithium secondary battery according to claim 1, wherein the compound of formula (I) has solubility of 1% by weight or higher in the electrolyte.

5. The lithium secondary battery according to claim 4, wherein the compound of formula (I) has solubility of 10% by weight or higher in the electrolyte.

6. The lithium secondary battery according to claim 1, wherein a content of the compound (I) is in the range of 0.01 to 10% by weight, based on the total weight of the electrolyte.

7. The lithium secondary battery according to claim 1, wherein the lithium-containing transition metal oxide is selected from the group consisting of $LiCoO_2$, $LiNiO_2$, $LiCO_{1/3}Mn_{1/3}Ni_{1/3}O_2$, $LiCo_{0.2}Mn_{0.3}Ni_{0.5}O_2$, $LiCo_{0.2}Mn_{0.4}Ni_{0.4}O_2$, $LiMn_2O_4$ and $LiNi_{1-x}Co_xO_2$ ($0<X<1$).

8. The lithium secondary battery according to claim 1, wherein the lithium salt is selected from the group consisting of $LiClO_4$, $LiCF_3SO_3$, $LiC_4F_9SO_3$, $LiPF_6$, $LiBF_4$, $LiAsF_6$, $LiN(C_2F_5SO_2)_2$ and $LiN(CF_3SO_2)_2$.

9. The lithium secondary battery according to claim 1, wherein the electrolyte compound is at least one selected from the group consisting of ethylene carbonate (EC), propylene carbonate (PC), butylene carbonate (BC), vinylene carbonate (VC), diethyl carbonate (DEC), dimethyl carbonate (DMC), ethylmethyl carbonate (EMC), gamma-butyro lactone (GBL), sulfolane, methyl acetate (MA), ethyl acetate (EA), methyl propionate (MP), ethyl propionate (EP), and any combination thereof.

10. A battery module comprising the lithium secondary battery of claim 1, as a unit battery.

11. The lithium secondary battery according to claim 1, wherein the lithium-containing transition metal oxide is at least one selected from the group consisting of $LiCoO_2$, $LiNiO_2$, $LiMnO_2$, $LiCo_xMn_yNi_zO_2$ ($0<x<0.4$, $0<y<0.5$, $0<z<0.7$), $LiMn_2O_4$ and $LiNi_{1-x}CO_xO_2$ ($0<X<1$).

12. A battery module comprising the lithium secondary battery of claim 2, as a unit battery.

13. A battery module comprising the lithium secondary battery of claim 3, as a unit battery.

14. A battery module comprising the lithium secondary battery of claim 4, as a unit battery.

15. A battery module comprising the lithium secondary battery of claim 5, as a unit battery.

16. A battery module comprising the lithium secondary battery of claim 6, as a unit battery.

17. A battery module comprising the lithium secondary battery of claim 7, as a unit battery.

18. A battery module comprising the lithium secondary battery of claim 8, as a unit battery.

19. A battery module comprising the lithium secondary battery of claim 9, as a unit battery.

* * * * *